United States Patent [19]

Chen et al.

[11] Patent Number: 4,914,644

[45] Date of Patent: Apr. 3, 1990

[54] DISK FILE DIGITAL SERVO CONTROL SYSTEM WITH COIL CURRENT MODELING

[75] Inventors: James C. Chen; Shih-Ming Shih; Mantle M. Yu, all of San Jose, Calif.

[73] Assignee: International Business Machines Corporation, Armonk, N.Y.

[21] Appl. No.: 249,619

[22] Filed: Sep. 26, 1988

[51] Int. Cl.$^4$ .................... G11B 21/08; G11B 21/10; G11B 5/55

[52] U.S. Cl. .................. 369/43; 360/78.09; 360/78.04

[58] Field of Search ............ 360/77.04, 78.09, 78.04; 369/43, 44

[56] References Cited

U.S. PATENT DOCUMENTS

| | | | |
|---|---|---|---|
| 4,133,011 | 1/1979 | Kurzweil, Jr. | 360/78.09 |
| 4,297,734 | 10/1981 | Laishley et al. | 360/78.09 |
| 4,412,161 | 10/1983 | Cornaby | 318/561 |
| 4,679,103 | 7/1987 | Workman | 360/77 |
| 4,835,632 | 5/1989 | Shih et al. | 360/78.04 |

OTHER PUBLICATIONS

*Digital Control of Dynamic Systems*, Franklin and Powell, Addison-Wesley Publishing Co. (1983), Chapter 6, pp. 131-139.

*Primary Examiner*—Robert L. Richardson
*Assistant Examiner*—David L. Robertson
*Attorney, Agent, or Firm*—Thomas R. Berthold

[57] ABSTRACT

A disk file digital servo control system utilizes a state estimator wherein the voice coil motor (VCM) current is modeled, rather than measured, thereby eliminating the need for analog-to-digital conversion of the actual VCM current. The VCM current is fed back directly to the input to the power amplifier where it is summed with the control signal output. This effectively changes the integrating power amplifier into a low pass filtering power amplifier, with linear input-output characteristics. Thus, during track following or short seeks, the VCM current is estimated based on this linear model. During long seeks, when the power amplifier is saturated, the VCM current is modeled based upon the known VCM characteristics during saturation, which include the effects of the back electromotive force and the coil current rise time. The microprocessor in the digital servo control system determines which VCM current model to use by a determination of when the power amplifier is in saturation. In the preferred embodiment, the microprocessor determines power amplifier saturation based upon a value of the head velocity error, which is the difference between the commanded velocity and the estimated velocity.

4 Claims, 6 Drawing Sheets

DISK FILE DIGITAL SERVO CONTROL SYSTEM WITH COIL CURRENT MODELING

TECHNICAL FIELD

This invention relates to servo control systems for read/write head positioning in data recording disk files. More particularly, the invention relates to a digital servo control system which utilizes a state estimator algorithm wherein current to the voice coil motor (VCM) is modeled, rather than measured.

BACKGROUND OF THE INVENTION

Disk files are information storage devices which utilize a rotatable disk with concentric data tracks containing the information, a head for reading or writing data onto the various tracks, and an actuator connected by a support arm assembly to the head for moving the head to the desired track and maintaining it over the track centerline during read or write operations. The movement of the head to a desired track is referred to as track accessing or "seeking", while the maintaining of the head over the centerline of the desired track during a read or write operation is referred to as track "following".

The actuator is typically a "voice coil motor" (VCM) which comprises a coil movable through the magnetic field of a permanent magnetic stator. The application of current to the VCM causes the coil, and thus the attached head, to move radially. The acceleration of the coil is proportional to the applied current, so that ideally there is no current to the coil if the head is perfectly stationary over a desired track.

In disk files which have a relatively high density of data tracks on the disk, it is necessary to incorporate a servo control system to efficiently move the head between tracks and to maintain the head precisely over the centerline of the desired track during read or write operations. This is accomplished by utilizing prerecorded servo information either on a dedicated servo disk or on sectors angularly spaced and interspersed among the data on a data disk. The servo information sensed by the read/write head (or the dedicated servo head if a dedicated servo disk is used) is demodulated to generate a position error signal (PES) which is an indication of the position error of the head away from the nearest track centerline.

In a disk file digital servo control system, a microprocessor utilizes a control signal algorithm to calculate a digital control signal based upon the digital values of certain state variables such as PES, VCM current and head velocity. The digital control signal is converted to an analog signal and amplified to provide input current to the VCM. Such a digital servo control system is described in U.S. Pat. No. 4,412,161, wherein the digital control signal is calculated recursively from prior control signals and prior values of the PES.

A recent development in digital disk file servo control systems, as described in assignee's U.S. Pat. No. 4,679,103, is a system which, as part of the computation of the control signal to the actuator, makes use of a state estimator algorithm to estimate the state (i.e., position, velocity and acceleration) of the head. In this type of system, a microprocessor receives, at discrete sample times, digital values corresponding to the PES and the VCM input current, and computes, through the use of the state estimator algorithm, a digital control signal. The digital control signal is then converted to an analog signal to provide a power amplifier control signal. A power amplifier then generates a new VCM input current. The method of estimating the state of the physical plant to be controlled in such a digital servo control system requires the use of estimator constants, the derivation of which is described in *Digital Control of Dynamic Systems,* Franklin and Powell, Addison-Wesley Publishing Co. (1983), chapter 6, pages 131-139. In the case of a disk file, these estimator constants are dependent upon the values of certain physical parameters of the disk file, such as the moving mass of the coil and head/arm assembly, the VCM force factor (the force applied to the coil per unit of input current), the gain of the VCM power amplifier, the PES gain and the time between PES samples (the PES sampling time).

In prior art digital servo control systems, the analog VCM current is measured and converted to digital form by an analog-to-digital (A/D) converter. This measured VCM current is required for two reasons. First, during track following or short seeks, when the power amplifier is not in saturation, the measured current is needed to provide closed-loop control. Secondly, during long seeks when the power amplifier is saturated, the digital value of the coil current is needed so that the state estimator can accurately predict head velocity. It is thus desirable in disk file digital servo control systems which use a state estimator to eliminate the hardware cost and time delay associated with A/D conversion, while retaining accurate VCM current information.

SUMMARY OF THE INVENTION

The invention is a disk file digital servo control system utilizing a state estimator, wherein the VCM current is modeled, rather than measured, thereby eliminating the need for analog-to-digital conversion of the actual VCM current.

The VCM current is fed back directly to the input to the power amplifier where it is summed with the analog control signal. This effectively changes the integrating power amplifier into a low pass filtering power amplifier, with linear input-output characteristics. Thus, when the power amplifier is not saturated, the VCM current can be easily modeled, based upon the linear characteristics of the power amplifier with VCM current feedback. During long seeks, when the power amplifier is saturated, the linear model of VCM current is not accurate. During this phase of operation of the disk file, the VCM current is modeled based upon the known VCM characteristics during saturation. The saturation model of VCM current incorporates the effects of both the back electromotive force (BEMF) and the coil current rise time.

The microprocessor in the digital servo control system determines which VCM current model to use by a determination of when the power amplifier is in saturation. In the preferred embodiment, the microprocessor determines power amplifier saturation based upon a value of the velocity error, which is the difference between the commanded velocity and the estimated velocity. When the velocity error is larger than a predetermined threshold, then the power amplifier is saturated and the saturation model of VCM current is used to arrive at the estimate of VCM current. The invention not only reduces the cost of the servo control system, by the elimination of analog-to-digital conversion circuitry, but also improves overall performance by elimination of the delay time to perform the analog-to-digital VCM current conversion.

The advantages of the invention are especially noticeable when the invention is incorporated in a digital servo control system which also includes a direct digitizing PES channel, which essentially eliminates the need for the only other A/D circuitry in the servo system, i.e., the A/D conversion of the PES.

For a fuller understanding of the nature and advantages of the present invention, reference should be made to the following detailed description taken in conjunction with the accompanying drawings.

DESCRIPTION

Prior Art

Figure 1:
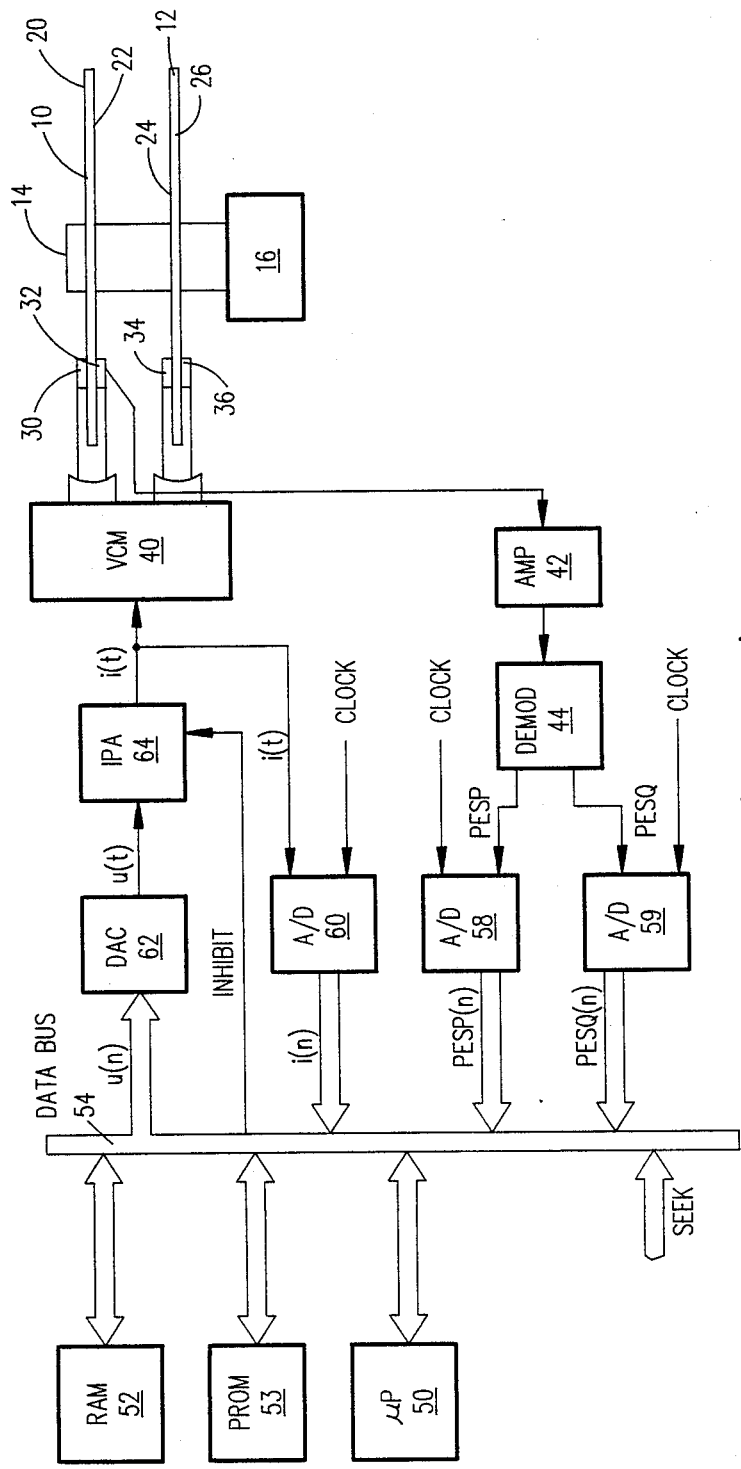
FIG. 1 is a block diagram of the prior art digital servo control system.

Referring first to FIG. 1, there is depicted a simplified block diagram of the digital servo control system described in U.S. Pat. No. 4,679,103, which is incorporated herein by reference. A pair of disks 10, 12 are supported on a spindle 14 of the disk file drive motor 16. Each of the disks 10, 12 has two surfaces 20, 22 and 24, 26, respectively. For purposes of this description, surface 20 on disk 10 and surfaces 24, 26 on disk 12 are data recording surfaces. Surface 22 on disk 10 is a dedicated servo surface and contains only prerecorded servo information.

The servo information on disk 10 is recorded in concentric tracks, with the position information typically written in such a manner that the intersections of adjacent servo tracks on servo surface 22 are radially aligned with the centerlines of the data tracks on surfaces 20, 24, and 26.

The specific tracks on the data disks and the servo disk are accessed by heads 30, 32, 34, 36, each of which is associated with a respective disk surface and supported by an associated arm assembly. The heads 30, 32, 34, 36 are attached to a common accessing means or actuator, such as VCM 40. Thus the heads 30, 32, 34, 36 are all maintained in a fixed relationship with one another relative to their radial position on their respective disk surfaces.

The signal read by servo head 32 is input to amplifier 42 and then demodulator 44. The servo position information on servo surface 22 is demodulated by demodulator 44 to generate two separate analog waveforms, designated primary (PESP) and quadrature (PESQ). The analog PESP and PESQ signals from demodulator 44 are sent to A/D converters 58, 59, respectively. The discrete values of PESP and PESQ at any sample time are designated PESP(n) and PESQ(n), where n represents a time index for each digital sample.

A microprocessor 50 is connected by data bus 54 and an address bus (not shown) to suitable memory devices, such as read/write memory (RAM) 52 and programmable read only memory (PROM) 53. Microprocessor 50 utilizes a control signal algorithm, as described in the '103 patent, to generate a control signal u(n). The control signal u(n) is output to digital-to-analog converter (DAC) 62 and integrated and amplified by integrating power amplifier (IPA) 64 to generate an analog current i(t) to VCM 40. The analog current i(t) is fed back to A/D converter 60, which provides a digital current signal i(n) to microprocessor 50. Microprocessor 50 thus receives as inputs, at discrete sample times, the digital actuator current i(n) and the digital head position error signals PESP(n) and PESQ(n). Microprocessor 50 computes the actual position error signal PES(n) from the values of PESP(n) and PESQ(n), using conventional logic, as described in the '103 patent. Also shown as input to microprocessor 50 via data bus 54 is a seek command signal from the disk file control unit (not shown). The seek command signal is a digital value which identifies the target track to which the heads are to be repositioned.

Figure 2:
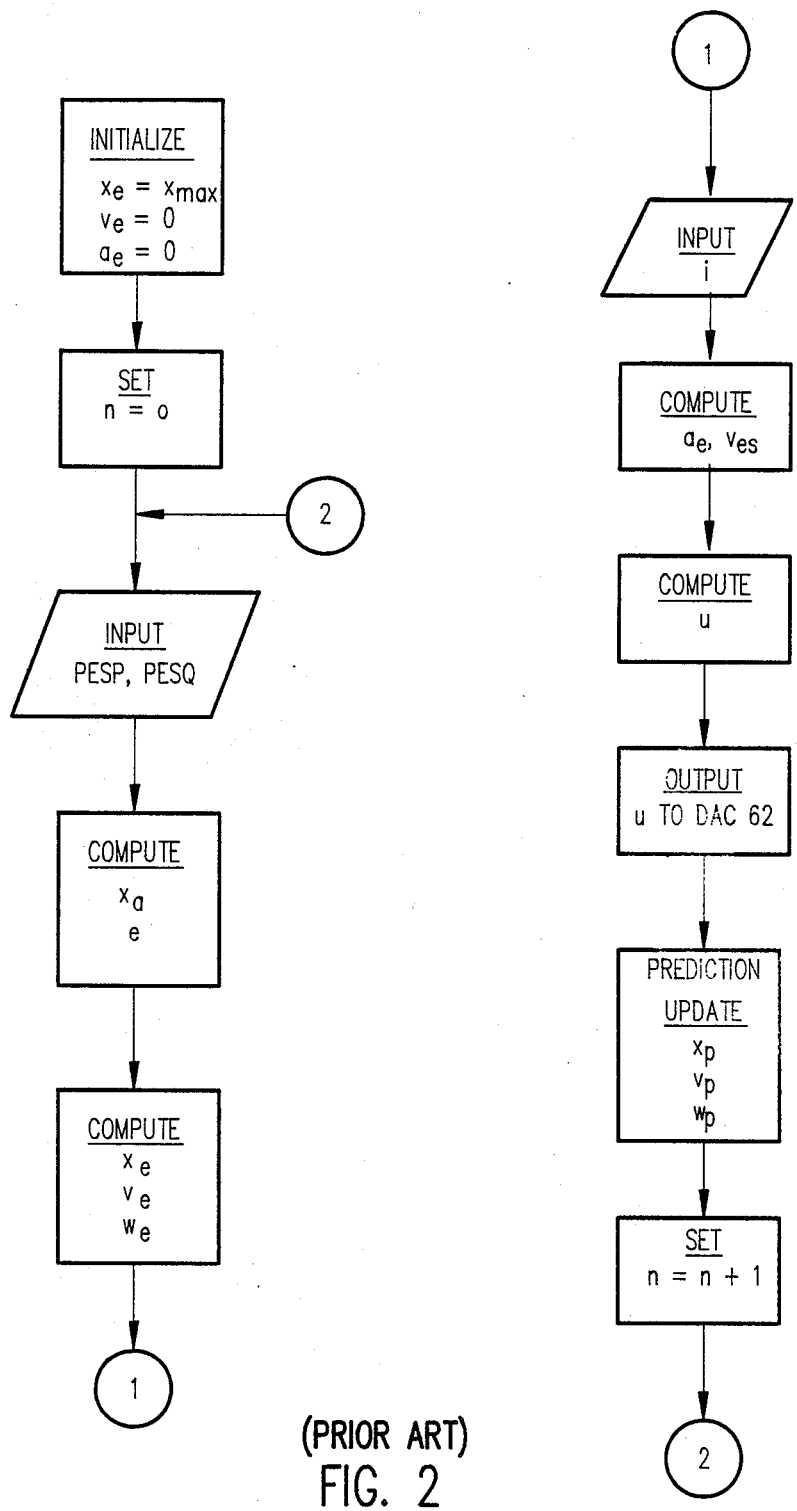
FIG. 2 is a simplified flow chart illustrating the steps in computing the control signal from the PES and measured VCM current in the prior art digital servo control system.

A simplified flow chart for the state estimator algorithm, which is more fully described in the '103 patent, is illustrated in FIG. 2 for purposes of illustrating the prior art. The microprocessor 50 first initializes the state of the VCM 40 by setting the estimated head position, velocity and acceleration, $x_e$, $v_e$ and $a_e$, to respective values of $x_{max}$, 0 and 0. Since, for purposes of this explanation, this is assumed to be the first computation of the control signal u, then the counter n is set equal to 0. Microprocessor 50 then inputs the digital values of PESP and PESQ, which are required to compute the actual head position, $x_a$. An error term, e, is next computed as the difference between $x_a$ and the predicted head position $x_p$ from a previous prediction update. The estimated head position, $x_e$, and velocity, $v_e$, are computed based upon the error term, e, and the predicted head position and velocity, $x_p$ and $v_p$. In addition, a "windage" estimate, $w_e$, is made as an estimate of the actuator current required to compensate for certain low frequency or steady state bias forces acting on the VCM. The sensed actuator current i is then input by microprocessor 50 and used to compute the estimated head acceleration, $a_e$. The velocity error signal, $v_{es}$, is then computed based upon the difference between the commanded velocity, $v_c$, and the estimated head velocity, $v_e$. The actual control signal u is then computed and output to DAC 62. The control signal generated by the state estimator algorithm is a function of the prior control signal, the velocity error signal $v_{es}$, and the estimated head acceleration, the latter of which is a function of the measured VCM current. Following the output of the control signal, the prediction of the state variables $x_p$, $v_p$ and $w_p$ is updated. These predicted terms are functions of prior control signals, the prior measured VCM current, the prior estimated head position, head velocity and windage, and estimator constants defining physical parameters of the disk file. The counter, n, is updated and the predicted terms are then used in the next sample for computation of the estimate of the state variables.

Preferred Embodiments

Figure 3:
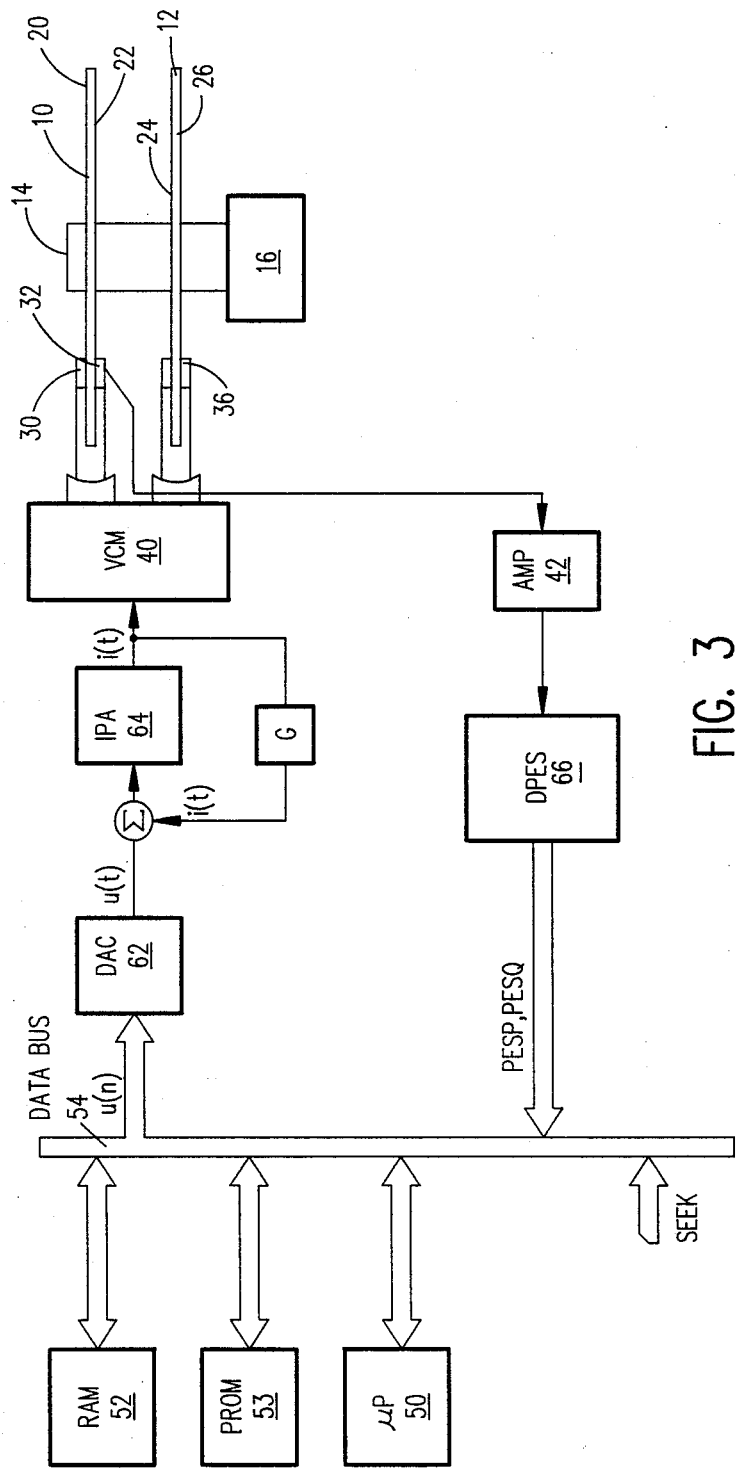
FIG. 3 is a block diagram of the digital servo control system of the present invention illustrating the VCM current feedback and the elimination of A/D conversion of the VCM current.

A simplified block diagram of the digital servo control system according to the present invention is illustrated in FIG. 3. It should be noted, by comparison with the prior art illustration of FIG. 1, that there is now provided a feedback of VCM current, i(t), to the input of IPA 64, where VCM current is summed with the analog control signal, u(t). In the actual hardware implementation, a gain is provided in the feedback path to match the desired bandwidth of IPA 64. This feedback path essentially converts IPA 64 into a low pass filtering power amplifier with linear characteristics. The VCM current can then be accurately estimated when IPA 64 is operating in its linear range, i.e., during track following and short seeks. There is thus no need for A/D converter 60 (FIG. 1).

It should also be noted, by comparison with FIG. 1, that A/D converters 58, 59 and demodulator 44 have been replaced with a digitizing PES channel (DPES) 66. The DPES 66 presents head position information in a digital word, instead of an analog voltage, thereby eliminating the need for discrete A/D converters 58, 59 (FIG. 1). The DPES illustrated in FIG. 3 is not a part of the present invention, but is described herein since the advantages of the present invention are best utilized in a digital control system which has no A/D converters. However, the present invention is fully applicable with the prior art technique, shown in FIG. 1, for discrete demodulation and A/D conversion of the servo signal to form PESP and PESQ.

Figure 4:
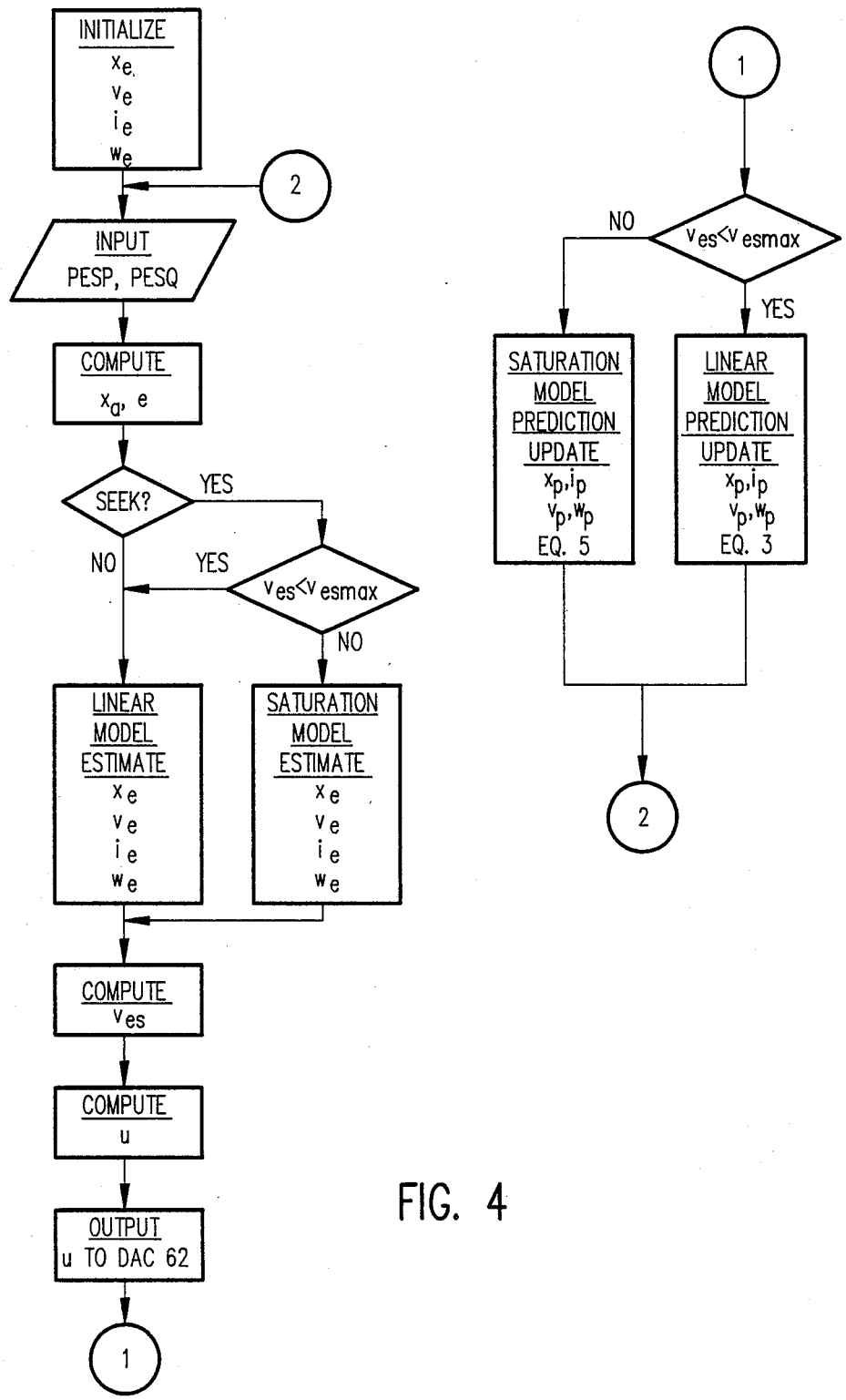
FIG. 4 is a simplified flow chart illustrating the computation of the estimated VCM current from the two VCM current models, as part of the computation of the control signal in the present invention.

A flow chart for the state estimator and the computation of the control signal according to the present invention is illustrated in FIG. 4. Referring to the INITIALIZE block in FIG. 4, there are four state variables: head position $x_e$, head velocity $v_e$, VCM current $i_e$, and windage $w_e$. Following the initialization of these estimated values, the digital values of PESP and PESQ are INPUT to microprocessor 50 from DPES 66. As indicated in the next COMPUTE block, the microprocessor then computes the head position $x_a$ and estimator error e as previously described.

Following the computation of $x_a$ and e, a SEEK determination is made. If the servo system is not seeking, i.e., causing the heads to move from one data track to another, then the servo system is in the track following mode. The four state variables are then estimated in the LINEAR MODEL ESTIMATE block according to the following equation, which expresses the estimated state according to the linear model of VCM current and which is represented in matrix form.

$$\begin{pmatrix} x_e(n) \\ v_e(n) \\ i_e(n) \\ w_e(n) \end{pmatrix} = \begin{pmatrix} x_p(n) \\ v_p(n) \\ i_p(n) \\ w_p(n) \end{pmatrix} + \begin{pmatrix} L_1 \\ L_2 \\ L_3 \\ L_4 \end{pmatrix} e(n) \quad (1)$$

Next, the velocity error signal, $v_{es}$, is computed. The control signal u is then computed and OUTPUT to DAC 62. It should be noted, by comparison with the prior art method of FIG. 2, that between the INPUT of PESP and PESQ and the OUTPUT of u there is no need for microprocessor 50 to input the digital measured value of VCM current. Following the OUTPUT of u, a decision point is reached to determine which of the two VCM current models to use for the estimator state PREDICTION UPDATE phase. If the velocity error signal $v_{es}$ is less than an experimentally predetermined threshold, noted as VESMAX, then this is an indication that the power amplifier is not saturated, and the algorithm branches to the LINEAR MODEL PREDICTION UPDATE block. Generally, this means that the disk file is in its data track following mode, or that the VCM is performing a short seek.

Figure 5:
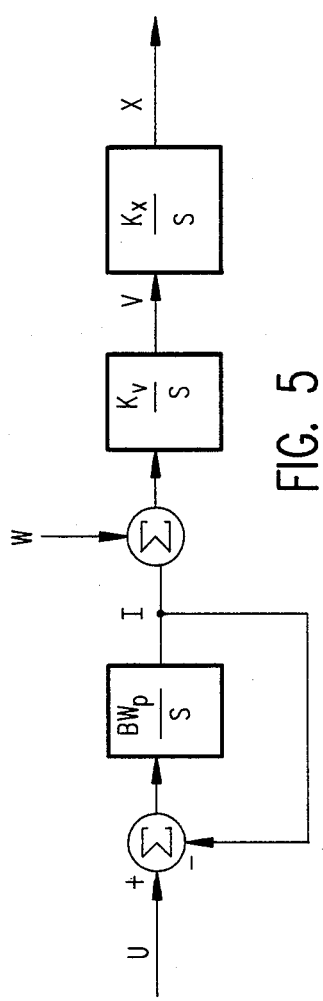
FIG. 5 is a block diagram of a continuous time model of the integrating power amplifier and VCM when the power amplifier is not saturated.

A representation of the nominal IPA 64 and VCM 40 during the non-saturation or linear phase is given by the block diagram of FIG. 5. In FIG. 5, S is the LaPlace operator, BW is the bandwidth of IPA 64, $K_v$ is the force factor $K_f$ divided by the mass M of the movable portion of the VCM and head arm assembly, and $K_x$ is the PES gain. The windage term W is represented as an uncontrolled input which is summed with the current output I from IPA 64 for input to VCM 40. This continuous time model of the VCM in its linear mode is represented in state space form as follows:

$$\begin{pmatrix} x \\ v \\ I \\ w \end{pmatrix} = \begin{bmatrix} 0 & K_x & 0 & 0 \\ 0 & 0 & K_v & K_v \\ 0 & 0 & -BW & 0 \\ 0 & 0 & 0 & 0 \end{bmatrix} \begin{pmatrix} x \\ v \\ I \\ w \end{pmatrix} + \begin{pmatrix} 0 \\ 0 \\ BW \\ 0 \end{pmatrix} u \quad (2)$$

The model represented by FIG. 5 and equation (2) is converted into a discrete time representation, as shown by equation (3) below, utilizing known conversion formulas from continuous to discrete time. This conversion is explained in the previously cited reference to Franklin and Powell.

$$\begin{pmatrix} x_p(n) \\ v_p(n) \\ i_p(n) \\ w_p(n) \end{pmatrix} = \begin{bmatrix} 1 & p_{12} & p_{13} & p_{14} \\ 0 & 1 & p_{23} & p_{24} \\ 0 & 0 & p_{33} & 0 \\ 0 & 0 & 0 & 1 \end{bmatrix} \begin{pmatrix} x_e(n-1) \\ v_e(n-1) \\ i_e(n-1) \\ w_e(n-1) \end{pmatrix} + \quad (3)$$

$$\begin{pmatrix} g_{11} \\ g_{12} \\ g_{13} \\ 0 \end{pmatrix} u(n-2) + \begin{pmatrix} g_{21} \\ g_{22} \\ g_{23} \\ 0 \end{pmatrix} u(n-1)$$

Referring again to the flow chart (FIG. 4) at the SEEK decision block, if a seek is in progress, then the algorithm branches to a decision block comparing $v_{es}$ to VESMAX. If a seek is in progress and $v_{es}$ is less than VESMAX, then this is an indication that a short seek is in progress and the algorithm branches to the LINEAR MODEL ESTIMATE block for the computation of the estimated state variables based on the linear model of VCM current as previously described. If, on the other hand, the decision is that the power amplifier is saturated, i.e., if $v_{es} \geq$ VESMAX, then the algorithm branches to the SATURATION MODEL ESTIMATE block for the computation of the estimated state variables based on the saturation model of VCM current. This computation is identical to equation (1) with the exception that the constant $L_i$ terms have different values. The $L_i$ terms are selected constants which are functions of the desired closed-loop poles for the specific system to be controlled. Because the $p_{ij}$ estimator constants are different for the linear and saturation models, the $L_i$ terms must be changed to give the same system response.

Figure 6:
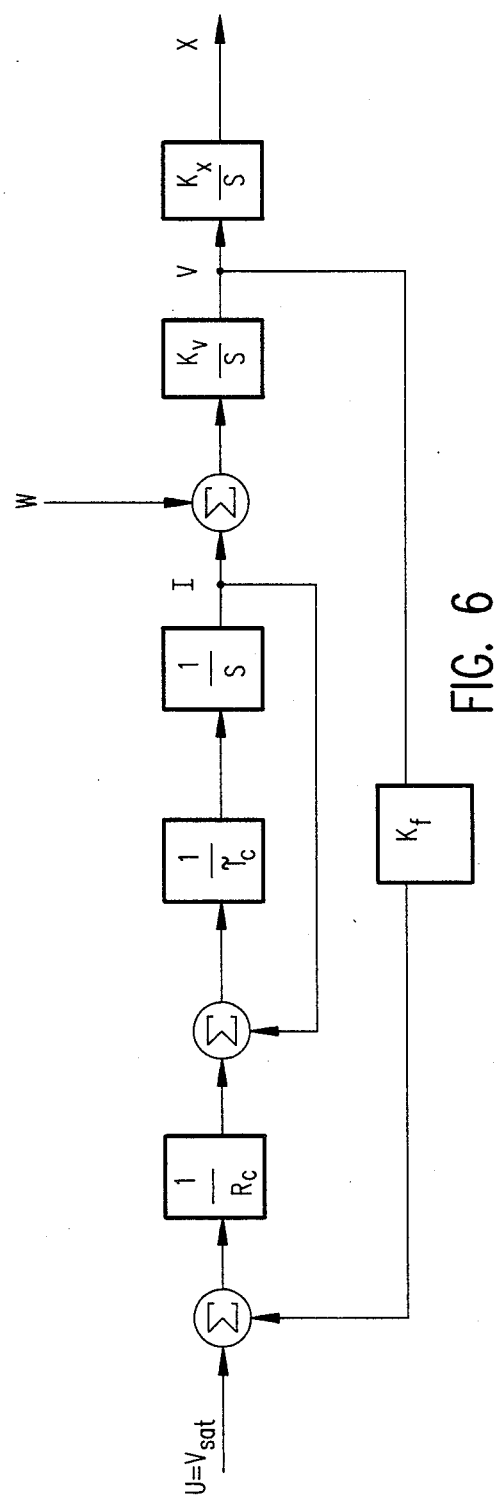
FIG. 6 is a block diagram of a continuous time model of the integrating power amplifier and VCM when the power amplifier is saturated.

After the estimated state variables are computed according to equation (1) as modified with the saturation model $L_i$ terms, $v_{es}$ is computed. The control signal u is computed and OUTPUT to DAC 62. The $v_{es}$ term is then compared with VESMAX, and, since a long seek is in progress, this decision block causes the algorithm to branch to the SATURATION MODEL PREDICTION UPDATE phase utilizing the saturation model for VCM current. The continuous time model of the power amplifier and VCM when the power amplifier is saturated is represented by the block diagram of FIG. 6. The saturation model of the VCM current includes the effect of BEMF and the coil current rise time. While it is known that a VCM actuator with a shorted turn is normally modeled with two time constants, simulation results have shown that a single time constant approximation is adequate for the saturation model of VCM current. In FIG. 6, the term $R_c$ is the resistance of the coil in VCM 40, $\tau_c$ is the time constant and $V_{sat}$ is the saturation voltage of IPA 64. This continuous time model can be represented by the following equation.

$$\begin{pmatrix} \dot{x} \\ \dot{v} \\ \dot{I} \\ \dot{w} \end{pmatrix} = \begin{bmatrix} 0 & K_x & 0 & 0 \\ 0 & 0 & K_v & K_v \\ 0 & \frac{-K_f}{R_c \tau_c} & \frac{-1}{\tau_c} & 0 \\ 0 & 0 & 0 & 0 \end{bmatrix} \begin{pmatrix} x \\ v \\ I \\ w \end{pmatrix} + \begin{pmatrix} 0 \\ 0 \\ \frac{1}{R_c \tau_c} \\ 0 \end{pmatrix} V_{sat} \quad (4)$$

The continuous model described by equation (4) is converted into a discrete time model according to the previously referenced conversion equations. The discrete time model can be represented as follows:

$$\begin{pmatrix} x_p(n) \\ v_p(n) \\ i_p(n) \\ w_p(n) \end{pmatrix} = \begin{bmatrix} 1 & p_{12} & p_{13} & p_{14} \\ 0 & p_{22} & p_{23} & p_{24} \\ 0 & p_{32} & p_{33} & p_{34} \\ 0 & 0 & 0 & 1 \end{bmatrix} \begin{pmatrix} x_e(n) \\ v_e(n) \\ i_e(n) \\ w_e(n) \end{pmatrix} + \begin{pmatrix} g_{11} \\ g_{21} \\ g_{31} \\ g_{41} \end{pmatrix} V_{sat} \quad (5)$$

The $p_{ij}$ and $g_{ij}$ terms in equations (3) and (5) are the essentially invariable estimator constants which are functions of the physical parameters of the disk file. The following equations establish the values of these estimator constants for the linear model, i.e., equation (3). The $p_{ij}$ and $g_{ij}$ values for the saturation model can be readily calculated by use of the terms in equation (4) with reference to the previously cited reference to Franklin and Powell.

$$p_{12} = K_x * T$$

$$p_{13} = (K_f/M) * K_x * (e^{-BW*T} - 1 + BW*T)$$

$$p_{14} = (K_f/M) * K_x * (T^2/2)$$

$$p_{23} = (K_f/M) * (1/BW) * (1 - e^{-BW*T})$$

$$p_{24} = (K_f/M) * T$$

$$p_{33} = e^{-BW*T}$$

-continued $$g_{11} = -(K_f/M) * (1/BW^2) * K_x * (e^{-BW*D} - 1 + BW*D - BW^2 * D^2/2)$$

$$g_{12} = (K_f/M) * (1/BW) * (e^{-BW*D} - 1 + BW*D)$$

$$g_{13} = 1 - e^{-BW*D}$$

$$g_{21} = -(K_f/M) * (1/BW^2) + (e^{-BW*T} - e^{-BW*D}) - (K_f/M)$$

$$g_{22} = (K_f/M) * (1/BW) * (e^{-BW*T} - e^{-BW*D}) + (K_f/M)(m)$$

$$g_{23} = e^{-BW*D} - e^{-BW*T}$$

where:
$K_f/M$ = acceleration factor,
$K_x$ = PES gain,
$K_p$ = power amplifier gain,
BW = bandwidth of power amplifier,
T = PES sampling time,
D = computation time delay between input of PES and output of digital control signal, and
m = T - D.

Referring again to the flow chart of FIG. 4, after the predicted values have been updated by use of either the linear or saturation model of VCM current, the microprocessor 50 is ready to receive the next values of PESP and PESQ. These values will be used, together with the updated predicted values of the state variables, including the predicted value of VCM current, to compute the estimated values of the state variables and the next control signal. Thus, the state estimator algorithm generates discrete values of the control signal from only the measured PES and without the need for a measurement of VCM current.

Figure 7:
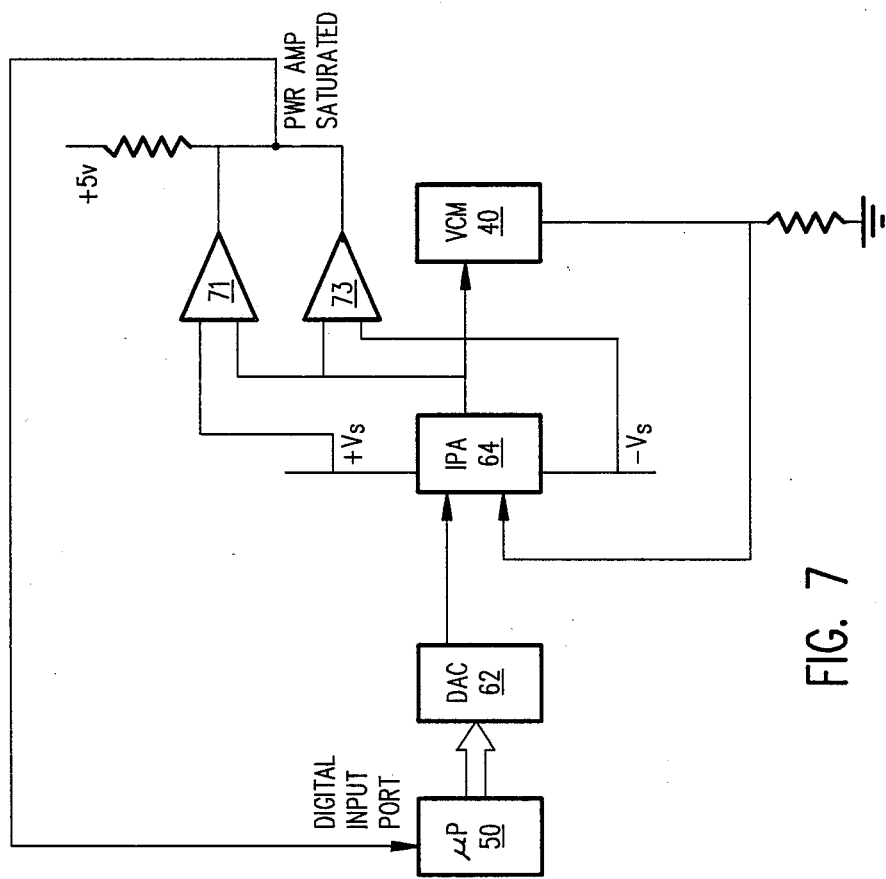
FIG. 7 is a block diagram of the digital servo control system illustrating circuitry for generating a digital signal to the microprocessor when the power amplifier is saturated.

Referring now to FIG. 7, there is illustrated an alternative embodiment for determining saturation of IPA 64. A pair of comparators 71, 73 compare the output voltage of IPA 64 with the positive and negative saturation voltage levels of IPA 64. If either saturation level is reached, then the appropriate comparator triggers a single status bit at a digital input of microprocessor 50.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An improved data recording disk file of the type having at least one rotatable disk with generally concentric data tracks thereon, the data disk or a separate servo disk having servo information recorded thereon, at least one head for reading the servo information during rotation of the disk, a voice coil motor (VCM) attached to the head for positioning the head relative to the data tracks, means for deriving from the servo information a digital head position error signal (PES), a processor for estimating the state variables of the VCM and for generating, from the estimated state variables and the digital PES, a digital control signal, means for converting the digital control signal to an analog control signal, and a power amplifier for amplifying the analog control signal and generating an input current for use by the VCM, wherein the improvement comprises:

means for providing direct feedback of the VCM current to the input of the power amplifier;

means for determining if the power amplifier is saturated; and said processor including means for making a first estimate of VCM current and for making a second estimate of VCM current in response to a determination of power amplifier saturation.

2. The improved disk file according to claim 1, wherein said saturation determining means further comprises means coupled to the power amplifier and the processor for comparing the power amplifier voltage to a predetermined threshold and for generating a signal to the processor when said voltage is above said predetermined threshold.

3. The improved disk file according to claim 1, wherein the disk file includes means for generating a commanded velocity of the head and wherein the estimated head velocity is one of the state variables of the VCM estimated by the processor, and wherein said power amplifier saturation determining means further comprises means in said processor for comparing the difference between the commanded velocity and the estimated velocity to a predetermined value.

4. An improved data recording disk file of the type having at least one rotatable disk with generally concentric data tracks thereon, the data disk or a separate servo disk having servo information recorded thereon, at least one head for reading the servo information during rotation of the disk, a voice coil motor (VCM) attached to the head and responsive to an input current for positioning the head relative to the data tracks, and means for deriving from the servo information a digital head position error signal (PES), wherein the improvement comprises:

a microprocessor coupled to the digital PES deriving means and responsive to the digital PES for generating a digital control signal, the microprocessor including means for estimating the VCM state variables, including VCM current, from predetermined estimator constants;

means coupled to the microprocessor for converting the digital control signal to an analog control signal;

a power amplifier coupled between the digital-to-analog conversion means and the VCM and responsive to the analog control signal for generating a VCM input current;

means for providing direct feedback of the VCM input current to the input of the power amplifier, whereby the VCM input current is summed with the analog control signal;

means for determining if the power amplifier is saturated; and wherein said estimating means in the microprocessor includes means for computing a first estimate of VCM current from a predetermined value of power amplifier bandwidth, and means responsive to a determination of power amplifier saturation for computing a second estimate of VCM current from predetermined values of VCM coil current resistance and rise time.

* * * * *